United States Patent [19]

Thorne, III et al.

[11] Patent Number: 5,670,955
[45] Date of Patent: Sep. 23, 1997

[54] METHOD AND APPARATUS FOR GENERATING DIRECTIONAL AND FORCE VECTOR IN AN INPUT DEVICE

[75] Inventors: Edwin Thorne, III, Seattle; Mark T. Hanson, Lynnwood; John P. Pennock, Bellevue; Luis A. Reyes, Woodinville, all of Wash.

[73] Assignee: Microsoft Corporation, Redmond, Wash.

[21] Appl. No.: 381,633

[22] Filed: Jan. 31, 1995

[51] Int. Cl.⁶ .......................... H03K 17/94; H03M 11/00
[52] U.S. Cl. .................. 341/34; 341/20; 341/22; 345/157; 345/159; 345/160; 178/18
[58] Field of Search ................. 341/20, 22, 34; 400/486; 345/157, 158, 160, 159, 169; 178/18

[56] References Cited

U.S. PATENT DOCUMENTS

| | | | |
|---|---|---|---|
| 4,983,786 | 1/1991 | Stevens et al. | 345/159 |
| 5,367,316 | 11/1994 | Ikezaki | 345/158 |
| 5,479,191 | 12/1995 | Komatsu | 345/157 |
| 5,563,629 | 10/1996 | Caprara | 345/160 |
| 5,563,630 | 10/1996 | Tsakiris et al. | 345/160 |

*Primary Examiner*—Thomas Mullen
*Assistant Examiner*—Timothy Edwards, Jr.
*Attorney, Agent, or Firm*—Seed and Berry LLP

[57] ABSTRACT

A thumbpad input device that enables a user to generate direction and speed by manipulating a round elastic pad. The underside of the pad is lined with a set of uniformly spaced contacts positioned in a circular pattern. Each contact is paired with a corresponding switch that is coupled to a circuit board. When a user presses down on the pad, one or more contacts close their respective switches. The pad contacts and switches are designed so that the number of closed switches varies with the magnitude of the force applied to the pad. The thumbpad input device has a micro controller that monitors the switches. It determines the most clockwise closed switch and the most counter-clockwise closed switch. Presumptively, these two closed switches define the two endpoints of an arc of all closed switches. These endpoints are then forwarded to a host processor. The host processor processes these endpoints to calculate the direction and speed of the symbol which correspond with the user's manipulation of the rubber pad.

28 Claims, 5 Drawing Sheets

| POSITION | X | Y |
|---|---|---|
| 0 | 0 | -1 |
| 1 | .383 | -.924 |
| 2 | .707 | -.707 |
| 3 | .924 | -.383 |
| 4 | 1 | 0 |
| 5 | .924 | .383 |
| 6 | .707 | .707 |
| 7 | .383 | .924 |
| 8 | 0 | 1 |
| 9 | -.383 | .924 |
| 10 | -.707 | .707 |
| 11 | -.924 | .383 |
| 12 | -.1 | 0 |
| 13 | -.924 | -.383 |
| 14 | -.707 | -.707 |
| 15 | -.383 | -.924 |

*Fig. 8*

| ARC POSITION | WEIGHT |
|---|---|
| 0 | 1 |
| 1 | 2 |
| 2 | 3 |
| 3 | 4 |

*Fig. 9*

METHOD AND APPARATUS FOR GENERATING DIRECTIONAL AND FORCE VECTOR IN AN INPUT DEVICE

FIELD OF THE INVENTION

This invention relates to input devices that generate directional and speed input, and more particularly for moving a cursor or symbol on a display device.

BACKGROUND OF THE INVENTION

Simple thumbpad devices for moving a cursor or symbol on a screen have few moving parts and are relatively inexpensive to manufacture. Not surprisingly, those devices are found in home entertainment systems. However, a major disadvantage of those thumbpad devices is that they can only generate a directional input and cannot sense the magnitude of the force being applied to the pad. As a result, the movement of a graphic character or symbol on a television (TV) screen is limited to only one pre-set speed. One current solution to this problem is to provide a separate speed-up button that increases the movement speed of a character when pushed. Further increase in the movement speed is controlled by depressing the speed-up button for a longer period of time. However, this solution is inadequate. The increased change in speed comes very gradually and the user must continuously press the speed-up button to accelerate the character movement speed. Moreover, it is inconvenient and distracting to use a separate speed-up button while using the direction pad at the same time, especially when the user needs to press other buttons for different effects on the TV screen such as selecting an option in a window, throwing a bomb at alien characters, or shooting at asteroids. A similar solution is to use the pad itself to increase the character movement speed. Again, the increase in speed comes from depressing the pad for a longer period of time. As before, this solution also suffers from the sluggish response time since further increase in speed comes from having to continuously depress the pad.

Another prior art input device uses variable capacitive sensors to measure the pressure being applied. The capacitive sensor input devices, however, have many drawbacks. Electrical noises and unstable voltage supply adversely affect performance of the capacitive sensors. Because those capacitive devices have complex analog to digital (A/D) converters and capacitive sensors, they are less durable and very expensive to manufacture. Finally, the capacitive sensors require calibration components which add inconvenience to a user and further add to the manufacturing cost. Other similar keypad devices employ resistive sensors or strain gauges to measure the pressure being applied to the pad. These devices, however, also suffer from the same disadvantages as those found in capacitive sensor based input devices.

Other currently available input devices include mice, trackballs, joysticks, and X-Y tablets. These prior art devices, however, have numerous moving parts and electronic circuits making them less durable and very expensive to manufacture. Specifically, they are impractical to be incorporated in a remote control device of an interactive TV controller unit as contemplated by the preferred embodiment of the present invention. Mice and trackballs, for example, have relatively complex components including rotatable balls, electronic sensors to sense the rotation of the balls, and electronic encoders. Tablet and other digitizing computer input devices require expensive digitizing tablets which is also impractical to be incorporated in a remote control device. A joystick device is more suited to be included in a remote control device. But, it requires a joystick, a pair of accurate variable resistors and A/D converters all of which are prone to breakage and relatively expensive to manufacture. Many of the prior art input devices further have the disadvantages of sensitivity to unstable voltage supply and electrical noise, and the requirement of calibration. Joysticks, for example, need to be calibrated and are adversely affected by an unstable voltage source.

SUMMARY OF THE INVENTION

The present invention relates to an input device for moving a cursor or pointer on a display device that avoids the problems described above. According to principles of the present invention, an improved thumbpad input device is provided for allowing a user to generate directional and magnitude of applied force input. The thumbpad input device includes a round elastic pad which a user may manipulate to generate those inputs. The underside of the rubber pad is lined with a set of uniformly spaced contacts that are positioned in a circular pattern. Each contact is paired with a corresponding switch that is coupled to a circuit board and is positioned to contact with its respective switch when the pad is depressed with sufficient force in the proximity of the contact.

When a user presses down on the pad, one or more contacts close their respective switches. The pad contacts and switches are designed so that the number of closed switches is dependent on the magnitude of the force applied to the pad. The thumbpad input device has a processing unit that monitors the switches. The processing unit scans the switches for closures. Once scanned, the processing unit transmits raw switch closure data to a host processor through infrared means, radio frequency means or wire means all of which are well known in the art. Based on the raw switch data, the host processor then determines the most clockwise closed switch and the most counter-clockwise closed switch. Presumptively, these two closed switches define the two endpoints of an arc of all closed switches, the arc getting larger as more pressure is applied to the pad. The midpoint of the arc represents the direction of a cursor and the number of closed switches in the arc represents the speed of the cursor. In an alternative embodiment, the switch closure data are processed in the processing unit of the thumbpad device. The processing unit determines the arc of all closed switches and transmits just the endpoints to a host processor.

The host processor processes these endpoints to calculate directional and force input that correspond with the user's manipulation of the rubber pad. In particular, for each closed switch, it uses a look-up table for (X,Y) directional coordinates. In a preferred embodiment, each directional coordinate is multiplied by a weight factor whose value depends on the position of the closed switch. The inner closed switches have higher weight values than the outer closed switches. Finally, these multiplied values are added together to yield a final pair of (X,Y) coordinates which represents a directional and force vector. In an alternative embodiment, all processing is done by a processing unit residing in the thumbpad itself and the resulting directional and force input are forwarded to the host processor.

The present invention provides many advantages that are not present in prior art input devices. The thumbpad device is very durable since there are very few moving parts. It is highly insensitive to voltage fluctuations, is immune from electrical noises and capacitance effects, and requires no calibration because the present thumbpad is completely digital in nature. Finally, the thumbpad is very inexpensive to manufacture since it uses standard key pad components.

BRIEF DESCRIPTION OF THE DRAWINGS

FIG. 8 is an example of an (X,Y) coordinate look-up table representing direction for each of the switches in the embodiment shown in FIG. 6.

FIG. 9 is an example of a weight table used to calculate the direction and force vector of user input.

DETAILED DESCRIPTION OF THE INVENTION

The preferred embodiment of the present invention provides an apparatus and method for generating force input (both magnitude and direction) with an input device that employs a thumbpad without using any type of force or speed sensors. Instead, the thumbpad unit as disclosed herein utilizes a plurality of contact based switches to calculate the force being applied to the thumbpad which represents the movement speed of the symbol displayed on the display device.

Figure 1:
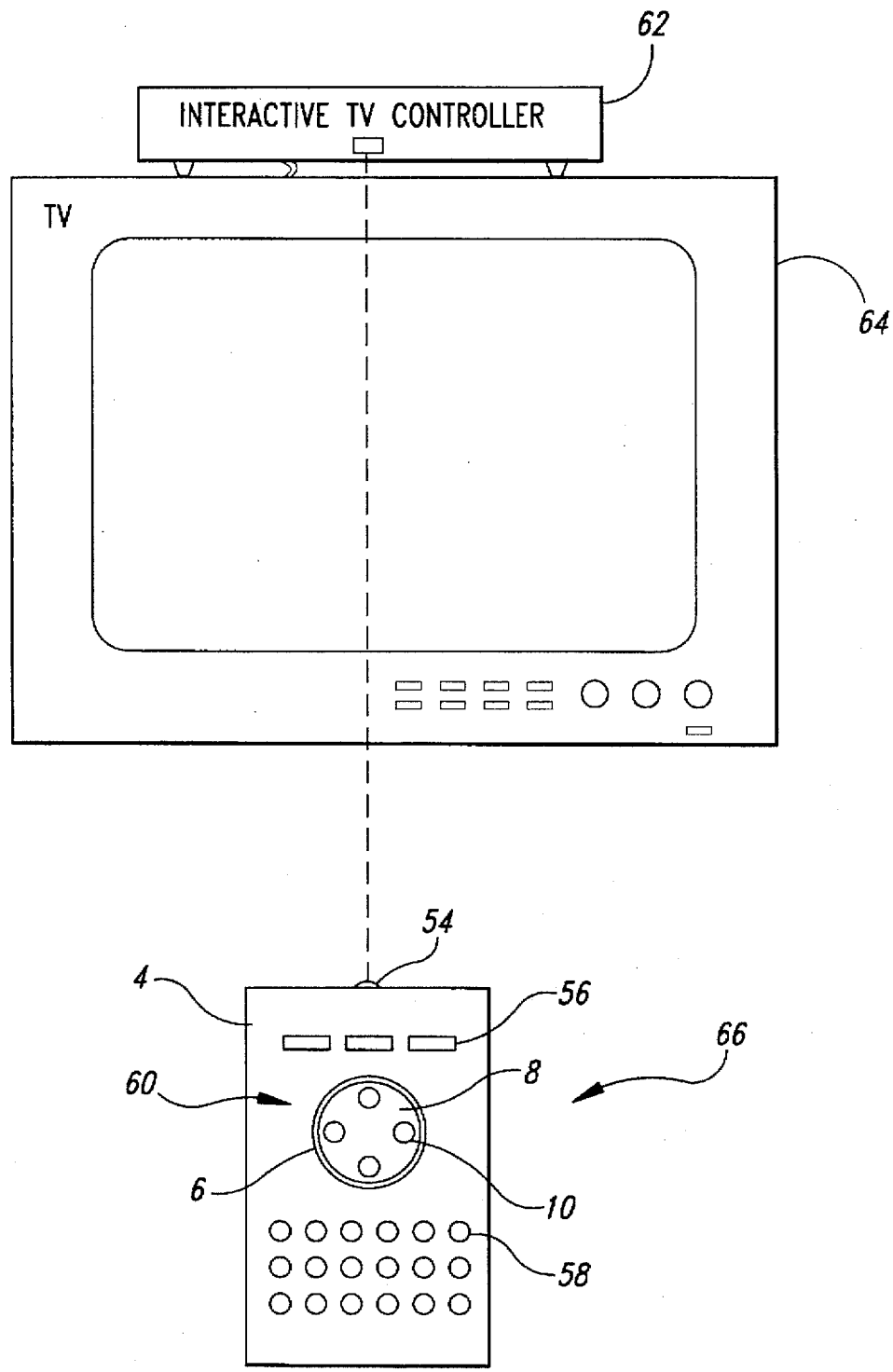
FIG. 1 is a perspective view of a preferred embodiment of the present invention showing an interactive TV controller connected to a TV and a thumbpad input device enclosed in a remote control device.

FIG. 1 shows an interactive television system of the preferred embodiment of the present invention. The interactive television system includes a remote control device 66, an interactive TV controller 62, and a television set 64. The remote control device 66 employs a thumbpad unit 60. The remote control device 66 has a plurality of control buttons 58 and 56 to be used in conjunction with the thumbpad unit 60. The remote control device 66 transmits user generated input to the TV controller 62 by infrared means 54 as is well known in the art. The TV controller 62 is connected to the TV set 64 for displaying graphic symbols and options (not shown) on its screen. A user controls movement of a symbol through the use of a round pad 8 of the thumbpad unit 60. The round pad 8 is captively held in a housing 4 and is retained within the housing by a retaining ring 6. There is, however, sufficient space between the retaining ring 6 and the round pad 8 for maneuvering the pad. In alternative embodiments, the shape of the pad can also be elliptical, square or even rectangular. Four directional reference members 10 on top of the round pad 8 are provided for more precise movement control of a symbol or cursor on a television set 64 by the user. Thus, the user can find his bearings on the round pad 8 without the need for looking at the round pad. While the embodiment shows four directional reference members 10, the pad 8 can have as few as one directional reference member since the user can guess the other directions without looking at the pad. Movement direction of the symbol is controlled by depressing a particular area of the round pad 8 which corresponds to the direction of the symbol on the screen. Movement speed of the symbol is controlled by the amount of force applied to the particular area of the round pad 8.

Figure 2:
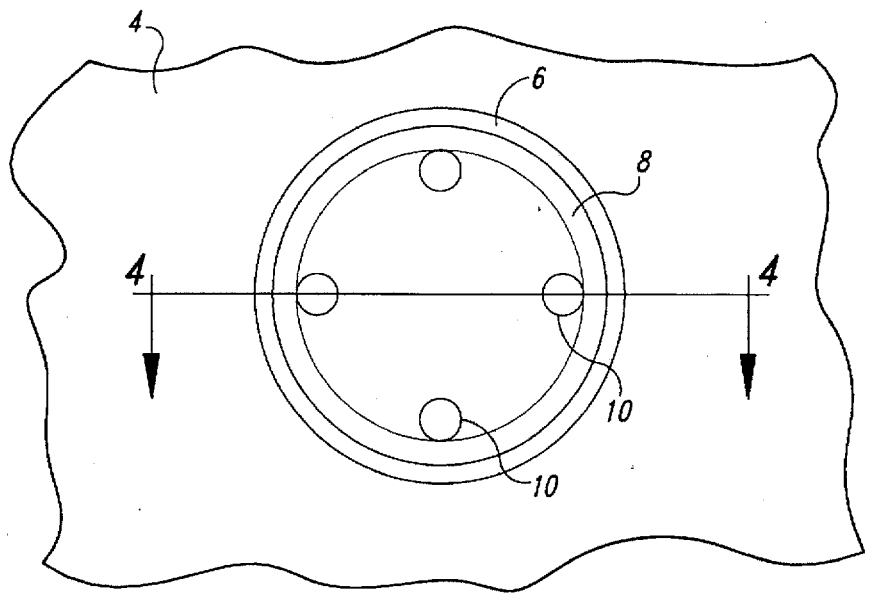
FIG. 2 is a planar view of a top surface of the thumbpad input device according to a preferred embodiment of the present invention.

FIG. 2 is an enlarged top view of the round pad 8. The round pad 8 is made of an elastomer that flexes in response to user input. While the pad 8 is preferably molded out of silicone, any flexible material in the underside of the pad can be used. The pad 8 also has a standard bellows (not shown) which provides resistance to the user's pressure on the pad when sufficient force is applied in a particular area of the pad. This gives the user tactile feedback indication of whether the user input has been registered in the thumbpad unit 60.

Figure 3:
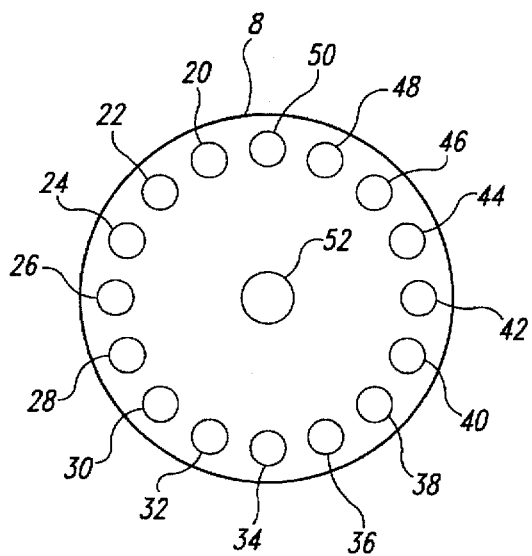
FIG. 3 is a planar view of a lower surface of a pad of the thumbpad input device of FIG. 2.

FIG. 3 shows a lower surface of the round pad 8 of FIG. 2. In the embodiment shown, sixteen actuating members or carbon contacts 20-50 are fused into the underside of the round pad 8 with each carbon contact representing a particular direction. The contacts 20-50 are spaced in a relatively uniform and circular manner in the perimeter of the round pad so that the user can move the symbol on the television set 64 in any direction with relatively equal pressure applied to the round pad 8. In an alternative embodiment, however, unequal distribution of contacts 20-50 may be used or even preferred especially if certain directions are favored over others. Sixteen contacts 20-50 were chosen for ease of implementation and sufficiency of resolution of the symbol movement as will be explained later herein with reference to FIG. 5. While this embodiment shows sixteen contacts 20-50, the number of contacts on the pad 8 will depend on a particular application of the thumbpad unit 60. Generally, more contacts provide finer resolution of the symbol movement.

Figure 4:
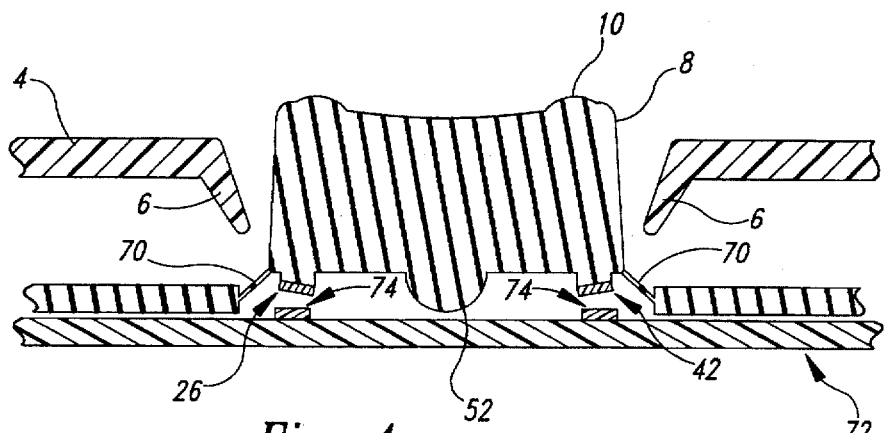
FIG. 4 is a cross-sectional view taken along lines 4—4 of FIG. 2.

FIG. 4 shows a cross-sectional view of the thumbpad unit 60 of FIG. 2 taken along lines 4—4. The upper surface of the round pad 8 is shaped to conform to the shape of a thumb by having raised edges and a dip in the middle of the round pad 8. While the directional reference members 10 are shown as raised round bumps in this embodiment, other shapes such as square bumps or even dips or grooves into the pad 8 itself can be used. Each carbon contact has a corresponding switch positioned to contact with the carbon contact. A pivot member 52 is provided for pivoting one side of the pad 8 towards a board member 72 while the opposite side pivots away from the board member 72. The height of the pivot member 52 with respect to the board member 72 is chosen to provide sufficient range of rocking motion. The carbon contacts 20-50 are slightly angled so that each contact makes a more solid contact with its respective switch 74 on the board when the round pad 8 is depressed. While the embodiment shows equal heights for all contacts 20-50, different contact heights can be used with primary contacts being slightly taller when certain directions are preferred over others. An annular member 70 secures the pad 8 to the board member 72 and provides biasing of the pad 8 away from the board 72 so that when no pressure is applied to the pad, every contact is facing its respective switch in an unactuated position.

Figure 5:
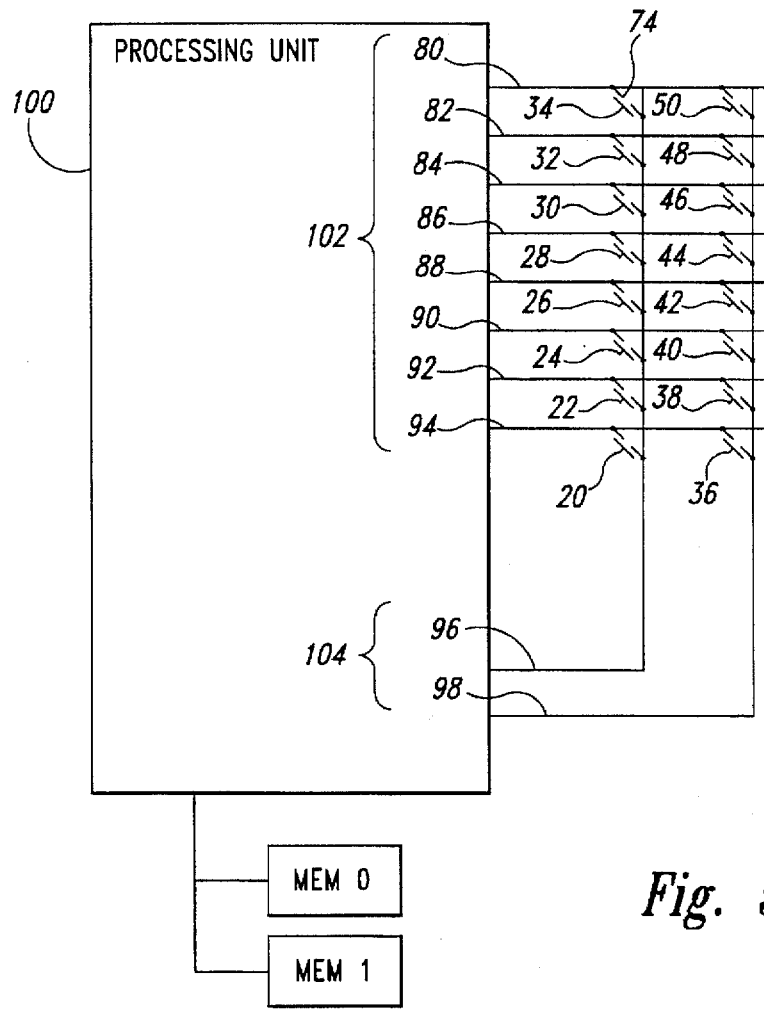
FIG. 5 is a hardware interface diagram for the thumbpad input device.

FIG. 5 shows a hardware interface diagram for interfacing a processing unit 100 of the thumbpad unit 60 with the switches 74 according to FIG. 4. In the embodiment shown, the switches 74 are interfaced with the processing unit 100 through a parallel port 102 in a matrix configuration with eight parallel input pins 80–94 and two scan port pins 96 and 98. When a user applies pressure to the pad 8, carbon contacts 20–50 in the underside of the pad will actuate one or more switches. The processing unit 100 scans the parallel port 102 and determines which switches are actuated. While the embodiment shown uses a plurality of normally open switches that are closed by the corresponding carbon contacts, those skilled in the art will appreciate that other types of switch mechanisms such as normally closed switches or variable resistance switches may be used. Since there are sixteen switches to be scanned and one eight bit parallel port, two scans are needed to obtain all switch positions. However, by using an eight bit port 102 rather than a sixteen bit port, the manufacturing cost of the thumbpad unit 60 is reduced. In a first scan, pin 96 of the scan port 104 is asserted and the eight input pins 80–94 in the parallel port 102 are read. In a second scan, pin 96 is de-asserted while pin 98 is asserted and the parallel port 102 is read again. Using this technique, the number of pins needed for the interface is reduced. The one drawback in this embodiment is that if more than eight contiguous switches are closed, it will short the two scan port pins 96 and 98 resulting in an erroneous reading of switch status. For example, if contacts 20 through 36 close their respective switches, the switches closed by contacts 20 and 36 cause a short between the two pins 96 and 98 resulting in an erroneous reading. The present invention is designed to avoid closure of more than eight switches at any one time. In an alternative embodiment, however, each switch can be connected to a separate pin of a data port to avoid this problem.

To further illustrate the scanning system, assume that contacts 34 and 36 close their respective switches. In a first scan, scan pin 96 is driven to a logic 0. Logic 0 is typically represented by zero volt and logic 1 by five volts as is well known in the art. Since contact 34 closed its respective switch, input pin 80 is also driven to logic 0. Pins 82 through 94, however, will be pulled up high through their associated pull-up resistors (not shown). With scan pin 96 held low, the processing unit 100 reads the parallel port 102 and stores this in random access memory (RAM) called MEM0. In a second scan, scan pin 96 is then allowed to float to a logic 1 while scan pin 98 is driven to a logic 0. Since contact 36 closed its respective switch, input port 94 is driven to logic 0. Pins 80 through 92, however, will be pulled up high through their associated pull-up resistors (not shown). With scan pin 98 held low, the processing unit 100 reads the parallel port 102 again and stores this in another RAM location called MEM1. By this matrix sampling method, MEM0 and MEM1 now contain raw data that indicate which switches are closed and which are open.

Figure 6:
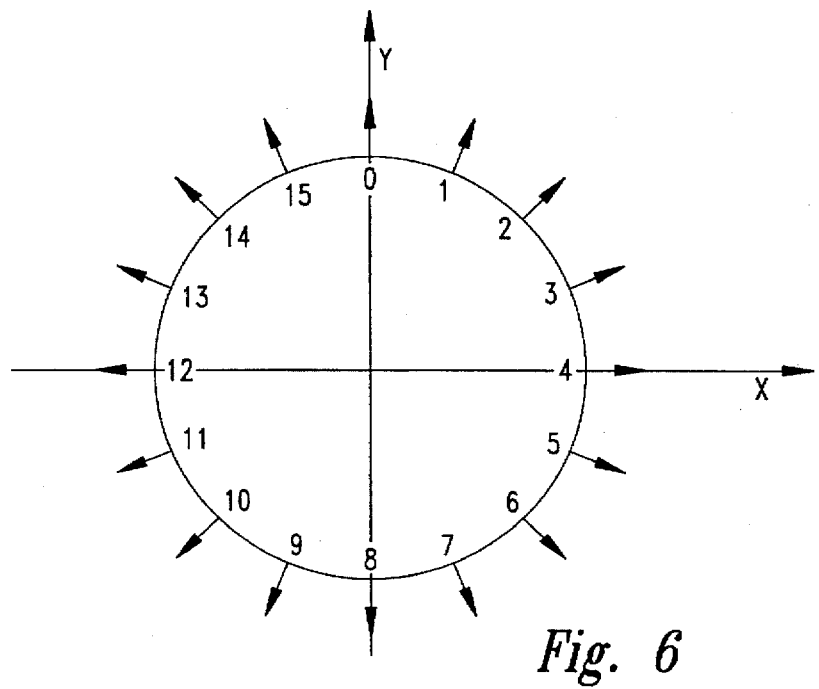
FIG. 6 depicts a set of sixteen switch positions that are under the pad of the preferred embodiment of the present invention lying on a unit circle of an X-Y plane.

FIG. 6 shows a software representation of sixteen switch positions 0 through 15 lying on a unit circle of an X-Y plane. Switch positions 0 through 7 are stored in MEM0 while switches 8 through 15 are stored in MEM1.

Figure 7:
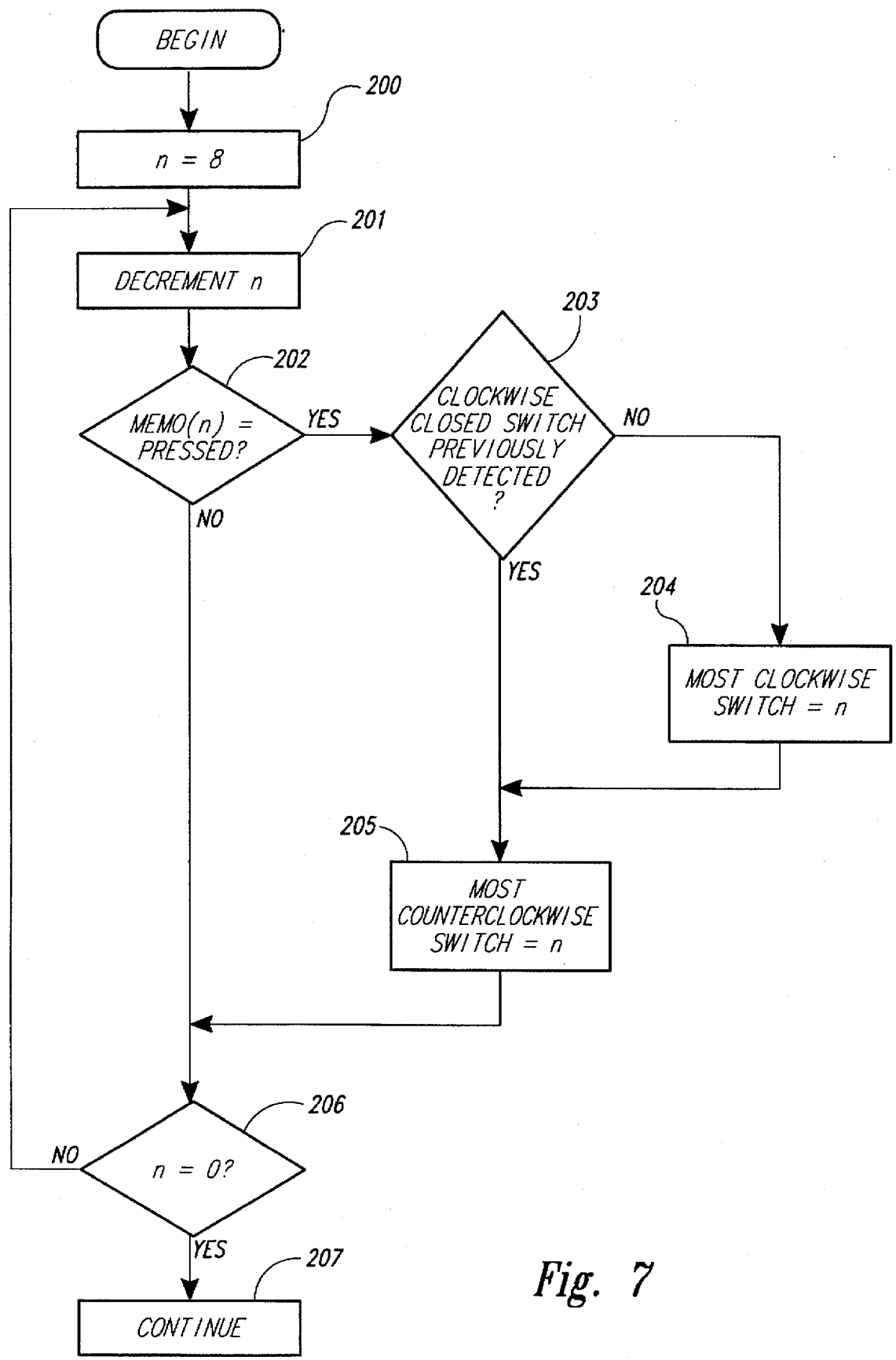
FIG. 7 is a flow chart showing the steps performed to scan the switches in the embodiment of the present invention as shown in FIG. 4.

FIG. 7 shows a software flow chart for determining the most clockwise closed switch and the most counter-clockwise closed switch of an eight bit word, MEM0 which corresponds to switches 0 through 7 of FIG. 6. The bit counter value "n" is set to 8 and a loop is started (step 200). In the loop, n is decremented (step 201). The value of the bit (n) of MEM0 is tested to see whether switch n was pressed when the switches were scanned (step 202). For the first iteration, n=7, and bit 7 of MEM0 is tested (step 202). When the first instance of a closed switch is detected 202, a 4 bit binary number representing this switch position is saved in memory as the most clockwise closed switch in this byte (step 204) and the most counterclockwise closed switch in this byte (step 205). Whenever a new closed switch position is encountered, it tests to see whether the most clockwise closed switch is detected (step 203). If yes, this new closed switch position is saved only as the most counter-clockwise closed switch in this byte (step 205). Since the software is counting down from the clockwise to counter-clockwise direction, this counter-clockwise value will be replaced each time another closed switch position is detected. The second byte MEM1 is processed the same way as the first byte, except that bit(n) corresponds to switch (n+8). If closed switch locations were found in only one byte, the values found in that byte for most counter-clockwise and most clockwise switches will be transmitted to the host processor 62. If closed switch locations were found in more than one byte, a test must be done to see where the closed switches crossover from one byte to the other. In the embodiment of FIG. 6, the possible crossover points could be between MEM0 bit 7 (Switch 7) and MEM1 bit 0 (Switch 8), or MEM1 bit 7 (Switch 15) and MEM0 bit 0 (Switch 0). In the first case, the most counter-clockwise switch from MEM0 and the most clockwise switch from the MEM1 are transmitted to the host processor 62. In the second case, the most counter-clockwise switch from MEM1 and the most clockwise switch from MEM0 are transmitted to the host processor 62.

Once the endpoints of the closed switches are obtained, they are translated into coordinate data to find a directional and force vector in the form of a coordinate pair (X,Y). In one embodiment, these endpoints are processed by the processing unit 100 in the thumbpad device 60. In a preferred embodiment, however, these endpoints are formatted and transmitted to a host computer 62 by infrared means 54 well known in the art. Regardless of which processor calculates the directional and force vector, the final data should be a coordinate pair (X,Y) that describes the speed and direction of the symbol movement in a display device. In a preferred embodiment, an (X,Y) coordinate look-up table (see FIG. 8) is used. A weight scale is also used for weighting the inner closed switch positions more heavily than the outer closed switch positions. Referring to FIGS. 6 and 8, each of the switches in FIG. 6 has an entry in the (X,Y) coordinate look-up table of FIG. 8. For example, switch 4 in FIG. 6 has a corresponding (X,Y) table entry position of (+1,0). Note that in the "Microsoft" Windows Operating System, version 3.1 sold by Microsoft Corporation of Redmond, Wash., upward direction is negative. Accordingly, switch position 8 in FIG. 6 has a position of (0,+1) in FIG. 8.

To generate a directional and force vector, each closed switch position lookup entry (X,Y) is multiplied by a weight factor and the product is added to each other to yield a final (X,Y) value. A weight scale in the preferred embodiment as shown in FIG. 9 is linear. However, an alternative embodiment such as logarithmic weight scale can be used. Generally, the weight for an inner closed switch is higher than an outer closed switch, because the thumbpad unit assumes the direction represented by the inner closed switch more closely represents the user's directional input through the round pad 8. For example, assume that the switch 0 in FIG. 6 represents the most counter-clockwise switch and switch 4 the most clockwise switch in an arc of closed switches 0 through 4. The outer-most closed switches 0 and 4 equate to an arc position of 0 in FIG. 9 and thus a weight of 1. The inner-closed switches 1 and 3 equating to an arc position of 1 receives a weight of 2. Finally, the inner-most closed switch 2 equates to an arc position of 2 and thus a weight of 3.

To illustrate the translation process, assume that the user wants the cursor to go up and to the right of a display device 64 and the pressure applied to the pad 8 closes switches 0 through 4 of FIG. 6 as in the above example. The final (X,Y) values are calculated by the following:

$$X=\text{lookupX}[0]*\text{weight}[0]+\text{lookupX}[1]*\text{weight}[1]+\text{lookupX}[2]$$
$$*\text{weight}[2]+\text{lookupX}[3]*\text{weight}[1]+\text{lookupX}[4]*\text{weight}[0]$$

$$Y=\text{lookupY}[0]*\text{weight}[0]+\text{lookupY}[1]*\text{weight}[1]+\text{lookupY}[2]$$
$$*\text{weight}[2]+\text{lookupY}[3]*\text{weight}[1]+\text{lookupY}[4]*\text{weight}[0];$$

which equate to:

$$X=0*1+0.383*2+0.707*3+0.924*2+1*1=+5.735$$

and $$Y=-1*1+-0.924*2+-0.707*3+-0.383*2+0*1=-5.735.$$

This would correspond to a force vector of 8.11 magnitude and a direction angle of 45°.

An apparatus and method for generating a directional and force input have been disclosed herein. While various embodiments have been described in this application for illustrative purposes, the claims are not limited to the embodiments described herein. For example, while only a thumbpad input device has been disclosed, those skilled in the art will appreciate that principles of the present invention may be employed in various input devices such as a joystick input device with the plurality of switches replacing the variable resistors. Other equivalent devices or steps may be substituted for those described, which operate according to principles of the present invention, and thus fall within the scope of the claims.

We claim:

1. An input device comprising:
   a pad having an upper surface and a lower surface;
   a plurality of switches positioned to be actuated from pressure applied to the upper surface of the pad with each switch representing a particular direction, the number of actuated switches varying with magnitude of pressure applied to the pad;
   a sensor to detect which of the switches are actuated; and
   a translator to calculate magnitude and direction of force input based on the actuated switches.

2. The input device according to claim 1 wherein the translator includes a look-up table having (X,Y) coordinates of the direction each switch represents and magnitude and direction of force input are calculated by using the look-up table to obtain direction coordinates of each actuated switch and adding the direction coordinates of the actuated switches together.

3. The input device according to claim 1 wherein the pad is shaped to conform to a portion of a thumb contacting the pad.

4. The input device according to claim 1 wherein the pad further comprises at least one directional reference member on the upper surface of the pad for allowing a user to manipulate the pad without looking at the pad.

5. An input device comprising:
   a housing;
   a pad received within the housing, the pad having an upper surface and a lower surface;
   a board member received within the housing;
   a plurality of switches secured to the board member, the switches facing the lower surface of the pad, the number of actuated switches varying with magnitude of pressure applied to the upper surface of the pad;
   a sensor to detect which of the switches are actuated; and
   a translator to calculate magnitude and direction of force input based on how many switches have been actuated and which switches have been actuated.

6. The input device according to claim 5 wherein the translator includes a look-up table having (X,Y) coordinates of the direction each switch represents and magnitude and direction of force input are calculated by using the look-up table to obtain direction coordinates of each actuated switch and adding the direction coordinates of the actuated switches together.

7. The input device according to claim 5 further including a means for biasing the pad away from the switches.

8. The input device according to claim 5 wherein the pad further includes a pivot member attached to the center of the lower surface of the pad, the pivot member resting on the board member.

9. The input device according to claim 5 wherein the pad is shaped to conform to a portion of a thumb contacting the pad.

10. The input device according to claim 5 wherein the pad further comprises at least one directional reference member positioned on the upper surface of the pad for allowing a user to manipulate the pad without looking at the pad.

11. The input device according to claim 7 wherein the pad is biased away from the switches by an annular member having an inner edge and an outer edge, the inner edge being secured to the perimeter of the pad and the outer edge being secured to the board member.

12. The input device according to claim 8 further comprising a plurality of actuating members affixed to the lower surface of the pad with each actuating member facing its respective switch, wherein the actuating members are angled with respect to the respective switches so that each actuating member makes a more solid contact with its respective switch when the actuating member pivots about the pivot member towards the respective switch and actuates the switch.

13. An input device comprising:
   a housing;
   a pad received within the housing, the pad having an upper surface and a lower surface, the pad including
   a plurality of actuating members spaced relatively uniformly with each other and affixed to the lower surface of the pad;
   a board member received within the housing;
   a plurality of switches secured to the board member with each switch facing its corresponding actuating member and representing a particular direction, the switches being actuated by the corresponding actuating members when pressure is applied to the upper surface of the pad, the number of actuated switches varying with magnitude of pressure applied to the upper surface of the pad;
   a sensor to detect which of the switches are actuated;
   a translator to calculate magnitude and direction of force input based on how many switches have been actuated and which switches have been actuated.

14. The input device according to claim 13 wherein the translator includes a look-up table having (X,Y) coordinates of the direction each switch represents and magnitude and direction of force input are calculated by using the look-up table to obtain direction coordinates of each actuated switch and adding the direction coordinates of the actuated switches together.

15. The input device according to claim 13 further including a means for biasing the pad away from the switches.

16. The input device according to claim 13 wherein the pad further includes a pivot member attached to the center of the lower surface of the pad, the pivot member resting on the board member.

17. The input device according to claim 13 wherein the pad is shaped to conform to a portion of a thumb contacting the pad.

18. The input device according to claim 13 wherein the pad further comprises at least one directional reference member on the upper surface of the pad for allowing a user to manipulate the pad without looking at the pad.

19. The input device according to claim 15 wherein the pad is biased away from the switches by an annular member having an inner edge and an outer edge, the inner edge being secured to the perimeter of the pad and the outer edge being secured to the board member.

20. The input device according to claim 17 wherein the actuating members are angled with respect to the respective switches so that each actuating member makes a more solid contact with its respective switch when the actuating member pivots about the pivot member towards the respective switch and actuates the switch.

21. A display control system comprising:
   an input device comprising
      a pad having an upper surface and a lower surface;
      a plurality of switches positioned to be actuated from pressure applied to the upper surface of the pad with each switch representing a particular direction, the number of actuated switches varying with magnitude of pressure applied to the pad; and
      a sensor to detect which of the switches are actuated;
   a translator to calculate magnitude and direction of force input based on how many switches have been actuated and which switches have been actuated;
   a display device;
   a host controller connected to the display device for displaying symbols on the display device, the host controller including a processing means for moving a selected symbol on the display device with magnitude and direction of force input calculated by the translator.

22. The system according to claim 21 wherein the translator includes a look-up table having (X,Y) coordinates of the direction each switch represents and magnitude and direction of force input are calculated by using the look-up table to obtain direction coordinates of each actuated switch and adding the direction coordinates of the actuated switches together.

23. The system according to claim 21 wherein the pad is shaped to conform to a portion of a thumb contacting the pad.

24. The system according to claim 21 wherein the pad further comprises at least one directional reference member on the upper surface of the pad for allowing a user to manipulate the pad without looking at the pad.

25. A method of generating magnitude and direction of force input by an input device, the input device comprising a pad, a plurality of switches actuated by pressure applied to the pad with each switch representing a particular direction, a sensor, and a processor, the method comprising the steps of:
   scanning the switches by the sensor for actuation of the switches, the number of actuated switches varying with magnitude of pressure applied to the pad; and
   calculating by the processor magnitude and direction of force input based on how many switches have been actuated and which switches have been actuated.

26. The method according to claim 25 wherein the step of calculating magnitude and direction of force input comprises:
   obtaining direction coordinates of each actuated switch from a look-up table having (X,Y) coordinates of the direction each switch represents; and
   adding the direction coordinates of the actuated switches together.

27. A method of moving a symbol on a display device of a display control system, the display control system comprising a display device, a host controller connected to the display device, a processor, an input device having a pad, a plurality of switches actuated by pressure applied to the pad with each switch representing a particular direction, and a sensor, the method comprising the steps of:
   scanning the switches by the sensor for actuation of the switches, the number of actuated switches varying with magnitude of pressure applied to the pad;
   calculating by the processor magnitude and direction of force input based on how many switches have been actuated and which switches have been actuated; and
   moving by the host controller a selected symbol on the display device with magnitude and direction of force input calculated by the processor.

28. The method according to claim 27 wherein the step of calculating magnitude and direction of force input comprises:
   obtaining direction coordinates of each actuated switch from a look-up table having (X,Y) coordinates of the direction each switch represents; and
   adding the direction coordinates of the actuated switches together.

* * * * *